US010677983B2

(12) United States Patent
Westbrook

(10) Patent No.: US 10,677,983 B2
(45) Date of Patent: Jun. 9, 2020

(54) OPTICALLY UNIFORM FIBER, METHODS OF MAKING, AND METHODS OF INSPECTING

(71) Applicant: OFS Fitel, LLC, Norcross, GA (US)

(72) Inventor: Paul S Westbrook, Bridgewater, NJ (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 15/663,863

(22) Filed: Jul. 31, 2017

(65) Prior Publication Data

US 2019/0033516 A1 Jan. 31, 2019

(51) Int. Cl.
*G02B 6/02* (2006.01)
*C03C 25/106* (2018.01)
*C03C 25/143* (2018.01)

(52) U.S. Cl.
CPC ........ *G02B 6/02123* (2013.01); *C03C 25/106* (2013.01); *C03C 25/143* (2013.01); *G02B 6/02395* (2013.01); *C03C 2218/30* (2013.01); *G02B 6/02057* (2013.01); *G02B 2006/02161* (2013.01)

(58) Field of Classification Search
CPC ............ G02B 6/02123; G02B 6/02395; G02B 2006/02161; C03C 25/106; C03C 2218/30
USPC ........................................................ 385/37
See application file for complete search history.

(56) References Cited

U.S. PATENT DOCUMENTS

| 4,236,904 | A |  | 12/1980 | Lazay |  |
|---|---|---|---|---|---|
| 5,880,825 | A | * | 3/1999 | Jakobsen | G01M 11/37 356/237.1 |
| 6,048,911 | A | * | 4/2000 | Shustack | C03C 25/106 428/378 |
| 6,528,239 | B1 | * | 3/2003 | Starodubov | G02B 6/02104 430/290 |
| 8,591,777 | B2 |  | 11/2013 | Digiovanni et al. |  |
| 2011/0211600 | A1 | * | 9/2011 | Dantus | H01S 3/0057 372/25 |
| 2015/0071595 | A1 | * | 3/2015 | Chen | C08G 18/672 385/123 |
| 2015/0140556 | A1 | * | 5/2015 | Albert | G01N 21/64 435/6.11 |
| 2016/0223774 | A1 | * | 8/2016 | Bennett | G02B 6/4482 |

FOREIGN PATENT DOCUMENTS

| JP | H04123222 U | 11/1992 |
|---|---|---|
| JP | H06345492 A | 12/1994 |
| WO | 2014025732 A2 | 2/2014 |
| WO | 2016018918 A1 | 2/2016 |

OTHER PUBLICATIONS

Johnson;"Novel Optical Fibers:Draw-tower process creates high-quality FBG arrays";Laser Focus World;Oct. 1, 2012,6 pages.

* cited by examiner

*Primary Examiner* — Jerry M Blevins

(57) ABSTRACT

Disclosed herein is an optical fiber having an optically uniform coating having no physical defects in the coating greater than 100 micrometers in size over a length of 50 meters or greater.

6 Claims, 2 Drawing Sheets

OPTICALLY UNIFORM FIBER, METHODS OF MAKING, AND METHODS OF INSPECTING

BACKGROUND

Disclosed herein are fibers with optically uniform coatings, methods of making, and methods of inspecting fibers.

Fiber Bragg grating (FBG) arrays are seeing increased interest for a variety of applications. FBGs can be fabricated in a polymer coated fiber by laser inscription of the FBG into the glass optical core of the fiber. Physical defects in the polymer coatings degrade the optical quality of gratings written in the fiber. Physical defects also prevent transmission of light over large distances because they contribute to light scattering Improvements are needed in providing optically uniform fibers with no physical defects over a continuous length.

SUMMARY

Disclosed herein is an optical fiber having an optically uniform coating having no physical defects in the coating greater than 100 micrometers in size over a length of 50 meters or greater.

Disclosed herein too is a method of manufacture of an optical fiber having no physical defects in the coating greater than 100 micrometers in size over a length of 30 meters or greater, comprising providing an optical fiber; coating the optical fiber with a coating material in a coating system, wherein the coating step comprises one or more of filtering the coating material to remove particles having an average diameter greater than 100 micrometers in size; reducing air leakage into the coating system to prevent air bubbles in the coating system having an average diameter of 100 micrometers or greater in size; aligning the fiber in the coating system so the coating thickness at a given point on the optical fiber is within ±5% of an average coating thickness value; and curing the coating material to a degree of surface cure of greater than 85%.

The above described and other features are exemplified by the following figures and detailed description.

BRIEF DESCRIPTION OF THE FIGURES

The following Figure is exemplary.

DETAILED DESCRIPTION

Figure 1:
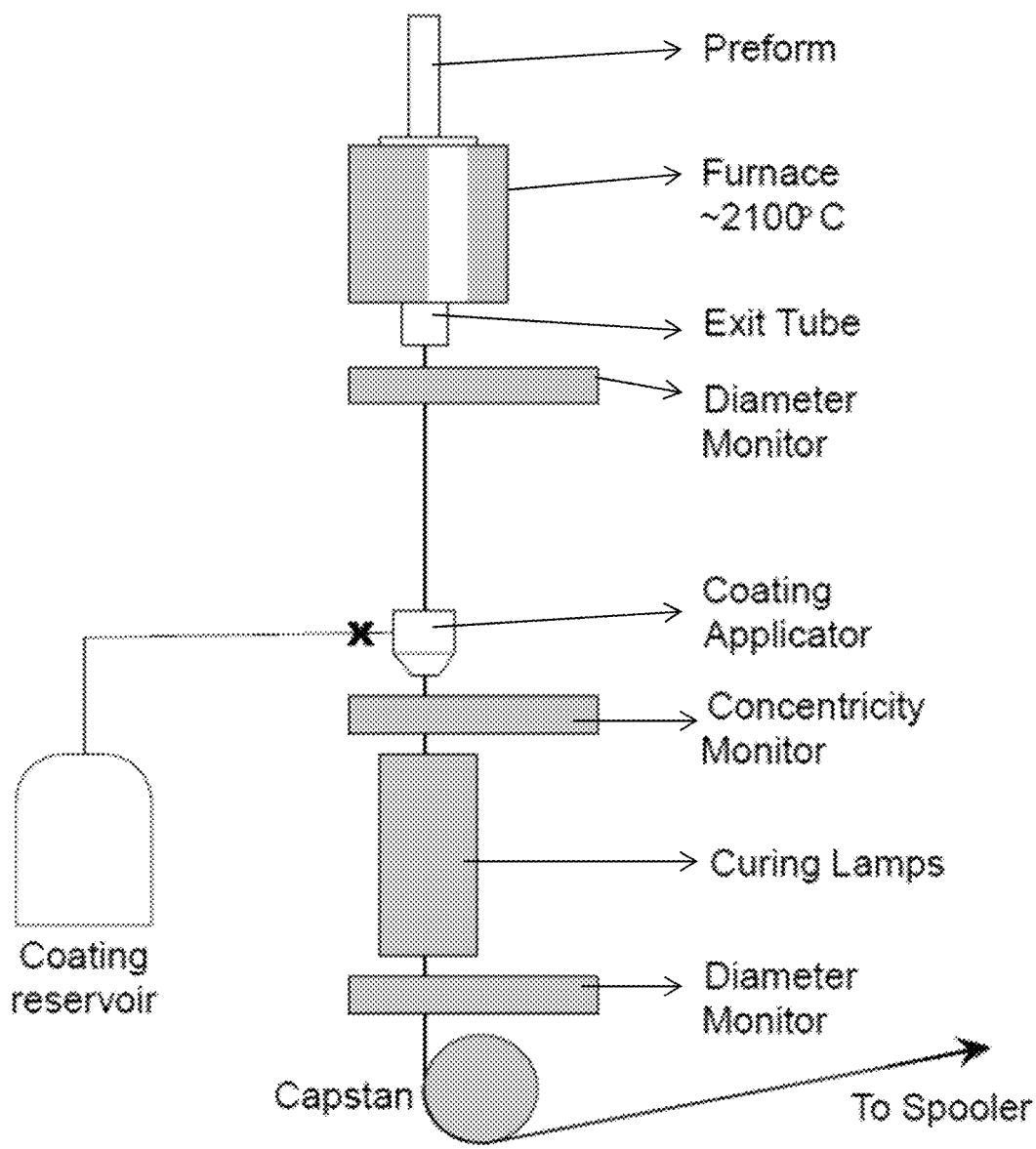
FIG. 1 shows an exemplary fiber draw tower.

Disclosed herein are optical fibers having an optically uniform coating having no impurities or physical defects in the coating greater than a provided size over a given length. In one embodiment, the optical fibers have an optically uniform coating that may not contain individual defects with a size greater than 25 micrometers in a fiber length of over 30 meters, preferably in a length of over 50 meters and more preferably in a length of over 100 meters. In one embodiment, the optical fibers have an optically uniform coating that may not contain individual defects with a size greater than 100 micrometers in a fiber length of over 25 meters, preferably in a length of over 30 meters, preferably in a length of over 50 meters and more preferably in a length of over 100 meters.

In an optically uniform coating, when a defect has a size of less than 25 micrometers, preferably less than 10 micrometers, it is separated from another similar sized defect (a nearest neighbor having a size of less than 25 micrometers, preferably a size of 10 micrometers or less) by at least four times the defect size, preferably at least 1 millimeter, and more preferably at least 1 meter, and yet more preferably at least 5 meters. In short, the fiber can be considered to have a defect free optically uniform coating if it has concentration of defects that are less than a certain size and in a concentration less than a certain amount.

The optical fiber has been modified by exposure to actinic radiation. "Actinic radiation" is defined as radiation at any wavelength which causes photochemical changes or variations in glass density, strain, optical properties or stress in the materials used in optical fiber fabrication. Actinic radiation includes ultraviolet radiation, infrared radiation, and/or visible radiation. As an example, actinic radiation has a wavelength between 200 to 315 nanometers. In one embodiment, a physical defect results in a non-uniform optical pattern when the optical fiber is exposed to light. The defect is typically a non-uniformity that results in a non-uniform optical pattern along a longitudinal axis of the fiber when the optical fiber is exposed to light from one or more sides of the optical fiber.

In a preferred embodiment, the coating is transparent to actinic radiation. In another embodiment, the coating is partially transparent to actinic radiation. In one embodiment, the coating allows 50% transmission of the actinic radiation. In another embodiment, the coating allows 80% transmission of actinic radiation.

Microscopic defects in optical fiber coatings can be catastrophic for their use in sensor systems and are difficult to detect with conventional methods. It is therefore desirable to provide optical fiber coatings that have as few defects or impurities as possible or, preferably, are free from physical microscopic defects. In one embodiment, it is desirable to reduce the number of physical defects in the polymer coating that is disposed on the fiber to as few as possible. Provided is an optical fiber having an optically uniform cured polymer coating having no physical defects in the coating with a size greater than 25 micrometers, preferably no physical defects in the coating with a size greater than 100 micrometers, over a fiber length of 30 meters or greater, preferably over a fiber length of 50 meters or greater; and more preferably over a fiber length of 100 meters or greater, where the optical fiber which has been modified by exposure to actinic radiation. The size of the defect refers to the diameter of the defect. It is desirable for the physical defect to not cause any measurable optical deviations in gratings written into the optical fiber over large lengths of the fiber. These optical deviations cause distortions in the diffraction grating which is undesirable.

The physical defect size refers to a largest dimension of the defect. For example, a defect having a large axis length of 5 micrometers, a small axis length of 2 micrometers and a depth of 2 micrometers would be described as having a defect size of 5 micrometers.

In one embodiment, it is desirable for a given defect or impurity to produce an attenuation of less than 3 decibels (dB), preferably less than 1 dB, and more preferably less than 0.1 dB over that of the background attenuation of the optical fiber coating.

Physical defects are those defects that cause an optically non-uniform coating. Such defects in cured polymer coatings promote distortions/losses in light transmission through the optical fiber. An example of a physical defect is a particle in the polymer coating; a bubble, such as an air bubble or bubble of other material; a scratch; a divot; a blob or gel ball of polymer or other foreign substance; a "necking", where a decrease in local cross-sectional area is present; a local perturbation in the thickness of the polymer coating relative to the average thickness of the polymer coating; or a combination comprising one or more of the foregoing.

An optically non-uniform polymer coating is a polymer coating having a difference between a desired and an actual optical property, such as a phase distortion, an amplitude distortion, a shadow, a defect that promotes or facilitates light scattering, a defect that promotes or facilitates light absorption, or a combination thereof. In embodiments, a defect in an otherwise optically uniform coating is a refractive index difference within the coating of ±10% of the average refractive index of the remainder of the coating. In another embodiment, a defect in an otherwise optically uniform coating results in a variation in an amplitude distortion in the index modulation of a fiber Bragg grating written through the optically uniform coating of greater than 25% to less than 50% from a desired value. In yet another embodiment, a defect in an otherwise optically uniform coating results in a grating phase distortion with a change of less than 1% fluctuation in the period of the grating, or a combination comprising at least one of the foregoing. In yet another embodiment, a defect in an otherwise optically uniform coating is one that causes a variation in optical absorption of the optical fiber coating that is greater than 10% of the average absorption.

The inventors hereof have found that correlated physical defects, i.e., one or more physical defects over a given length scale, may cause deviations in the optical pattern. As an example, one spherical air bubble less than 25 micrometers in diameter may not cause an optical deviation, whereas more than one air bubbles less than 25 micrometers in diameter in a length of less than four times the bubble diameter of the optical fiber or an individual bubble with a diameter greater than 25 micrometers in diameter may cause an optical deviation. In an embodiment, an optically uniform coating that is considered to be free of defects may have a physical defect of less than 100 micrometers in size in the optically uniform coating that is separated by a distance of more than four times the defect size from another nearest neighbor defect that is also less than 100 micrometers in size. Optical deviations may refer to variations in the optical pattern characterized by amplitude and phase of a fiber grating written with actinic radiation through the fiber coating.

In one embodiment, the optically uniform coating is a polymer coating. In another embodiment, the optically uniform coating is a cured (crosslinked) polymer coating. A polymer coating is disposed on an optical fiber, preferably a glass optical fiber, or onto other optical substrates that can have light-induced, for example actinic radiation-induced, UV-radiation induced, or infrared-induced, optical devices written into one or more portions within the optical fiber or substrate. The optical devices can be gratings, preferably fiber Bragg gratings. The optical fiber can comprise a glass optical core and a glass cladding, for example. In one embodiment, the polymer coating is disposed on and in intimate contact with the glass cladding. "Intimate contact" means two items are sufficiently close to each other that there are no gaps or voids that prevent any desired effect from occurring.

The optical fiber comprises a glass optical core and a glass cladding; and the polymer coating comprises acrylates, aliphatic polyacrylates, silsesquioxanes, alkyl substituted silicones, vinyl ethers, epoxy polymers, urethane acrylate polymers, polyimides, or a combination comprising at least one of the foregoing covering the glass optical core. The glass optical core may comprise silica and may be doped with germanium, boron, fluorine and chlorine. Fluorine and chlorine minimize absorption of light due to the presence of hydroxyl moieties present in the silica.

The polymer coating can be applied to a variety of optical fibers, including those having an optical core comprising a glass optical core and a glass cladding. Suitable optical fibers possess at least one guided mode in the wavelength range of interest. One example of a suitable fiber is a fiber with an inner core of relatively high refractive index, and an outer cladding with a lower refractive index than the inner core. Other suitable fibers can have an inner core of relatively high refractive index and one or several cladding layers with different, continuously or discontinuously varying, refractive indices that are typically lower than the refractive index of the core. The glass optical core can be made of UV photosensitive glass, such as germanosilicate, so that a grating can be written into the glass by UV radiation. The optical fiber is typically from 100 to 150 micrometers in diameter, although other diameters can be useful as well, as will be appreciated by one of ordinary skill in the art. In one embodiment, after the polymer coating is disposed on the optical fiber and cured, the fiber is subjected to the formation of gratings without coating removal. The cured coating has significant optical transparency at the wavelength of actinic radiation, such as 248 nm, where FBGs are often written. Writing with actinic radiation at other wavelengths is possible, particularly in the UV range, or infrared range. UV-induced gratings can be side-written into the polymer coated fiber without removing the polymer. Ultrashort pulses of lengths in the femtosecond range can in principle be used for side writing of gratings without removal of the coating as well, provided the focusing is such that the intensity in the coating is sufficiently low to avoid damage to the coating. In a further embodiment, optical fiber can have multiple cores within a single cladding structure.

As used herein, the term "coating" or "covering" or "layer" or similar terms does not necessarily mean that there is a uniformly thick coating, or that there are no defects, holes, thickness deviations, or other imperfections. Rather, the term "coating" or "covering" or "layer" means that the coating has the desired function, as described herein. The uniform optical coating can be of many material types, including polymers as one particular example.

A Bragg grating is a quasi-periodic modulation of the effective index of the guided modes of a waveguide, preferably in a single mode waveguide, i.e., a waveguide that supports only one guided mode in the wavelength range of interest. The period of this modulation is referred to as the grating period. As known to those skilled in the art, the grating period is chosen such that it couples the forward and backward propagating mode of the waveguide in the vicinity of the chosen center wavelength. Therefore, a Bragg grating is also referred to as a reflection grating. An example for a suitable waveguide is an optical fiber. The periodic modulation of the effective index can be achieved by a periodic modulation of the refractive index of the core of the waveguide. Such a periodic modulation can be created by exposing the fiber to a spatially-varying or time-varying optical pattern of actinic radiation. Alternatively, the refractive index in the cladding could be modulated as well. The phase of the periodic modulation of the refractive index is referred to as the grating phase. As known to those skilled in the art, an offset of the period of the grating is equivalent to an offset in the linear slope in the grating phase as a function of the position along the fiber. If there is a defect in the coating at the time of grating inscription (regardless of the type of actinic radiation used), a spatially nonlinear change of the grating phase can be the result.

In another embodiment, gratings are written with actinic radiation through the fiber coating at one or more discrete points along a length of fiber in excess of 10 meters. Defects in the coating will result in a low yield for the optical properties of such gratings. In this embodiment, the yield for such gratings is above 90% over the entire length of at least 10 meters.

The polymer coating can be applied to the glass fiber in any suitable manner, such as those known to a person of ordinary skill in the art, including using a draw tower to apply a coating to the glass fiber. FIG. 1 shows an exemplary example of a draw tower, where a glass preform is heated in a furnace to about 2100° C. The heated glass passes through an exit tube and through a diameter monitor. The polymer coating is passed from a reservoir to a coating applicator, where the polymer coating is applied to the glass giver. The polymer coating is cured by passing through curing lamps, and the diameter of the fiber with cured coating is monitored by a diameter monitor. The polymer coated fiber is passed through a capstan and to a spooler.

The polymer coating can be cured in any suitable manner, including UV curing or thermal curing. In an example, the coating can be partially cured using UV lamp exposure followed by thermal curing. The coating can be functionalized with or contain reactive groups so as to render them UV-curable. The coating can contain a UV photoinitiator that absorbs sufficient UV radiation to effectively cure the polymer to the desired level, but is relatively transparent to the UV radiation used for writing an optical device. In an embodiment, the optically uniform coating is transparent to ultraviolet radiation having a wavelength of 240 to 266 nanometers as well as to infrared radiation. The photoinitiators can be free radical type or cationic type, depending on the identity of the monomers and oligomers forming the polymer coatings. Aromatic free radical photoinitiators are preferably used at 0.01 to 0.2 weight percent (wt %), based on the total weight of the coating composition. Exemplary aromatic free radical type photoinitiators are IRGACURE 819, IRGACURE TPO, IRGACURE 1173, IRGACURE 4265, and IRGACURE TPO-L (commercially available from BASF). Aliphatic free radical photoinitiators are preferably used at 0.5 to 5 wt %, based on the total weight of the coating composition. Exemplary aliphatic free radical type photoinitiators include adamantyl methyl ketone and pinacolone. Cationic photoinitiators are preferably alkyl-substituted diaryliodonium or alkyl-substituted triarylsulfonium salts. Aromatic cationic photoinitiators are preferably used at 0.03 to 0.1 wt % for vinyl ethers and 0.1 to 1 wt % for epoxies. Exemplary cationic photoinitiators are Irgacure 250 and Irgacure 270 (commercially available from BASF).

Unless otherwise specified, "cured" means fully cured, or cured to a sufficient level (e.g., sufficiently-cured) to have the desired properties, as described herein. When sufficiently-cured, the fiber coatings provide mechanical protection of the glass fiber and are sufficiently hard to inhibit plastic deformation of the coating during typical handling storing prior the grating-writing step. The fiber coatings are also sufficiently transparent to UV radiation so that a desired level of UV radiation can pass through the fiber coatings to reach the fiber, to write an optical device into the fiber through the coatings, for example. The sufficiently-cured and optically transparent polymer coatings can have a UV absorbance ranging from 0.001 to 1 dB/micrometer at the writing wavelength of 248 nm or 860 nm, measured on 25 micrometer films between quartz disks. When cured, the polymer is substantially devoid of conjugated or unsaturated compounds, for example, aromatic compounds, that absorb UV light. Substantially devoid of conjugated or unsaturated compounds means the polymer does not contain an amount of conjugated or unsaturated compounds that would interfere with the desired characteristics of the polymer.

In one embodiment, the polymer coating can have a thickness on the optical fiber of between 20 and 80 micrometers. In another embodiment, the polymer coating can have a thickness on the optical fiber of between 50 and 70 micrometers. In yet another embodiment, the coating can be thermally cured and can be between 2 and 15 microns thick.

The polymer coating may comprise additional monomers or oligomers in addition to the primary component. A coating may contain one or more additives, such as adhesion promotors, thermal stabilizers, flame retardants, antioxidants, UV stabilizers, surface-tension modifying additives, slickness agents, in any useful amount. In one embodiment, a typical amount of an additive is between 0.01 and 1 wt % of each additive, based on the total weight of the coating.

Figure 2:
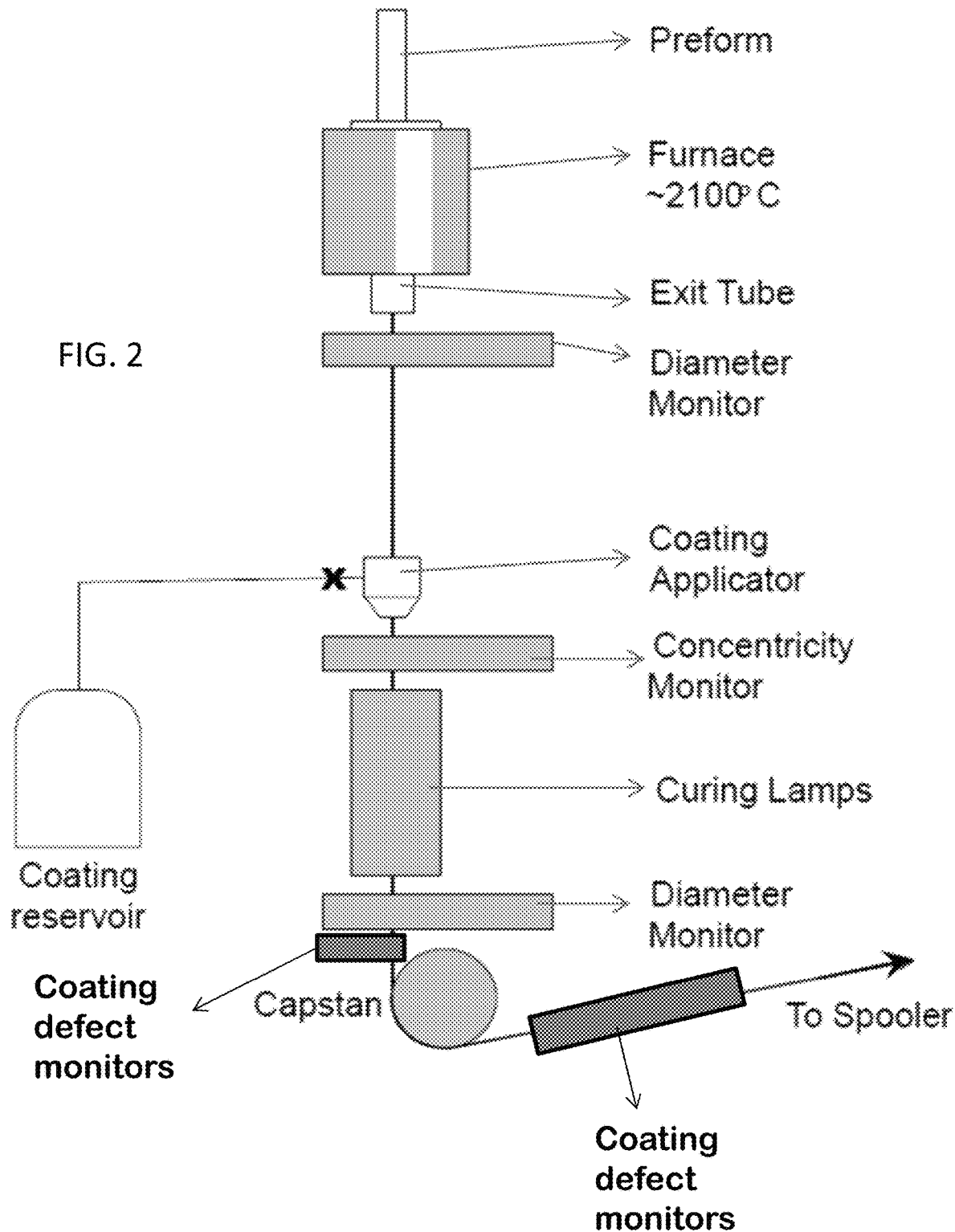
FIG. 2 shows a draw tower with one or more coating defect monitors that use imaging, light scattering, or other means to verify that the coating has defects below a certain level.

An inspected optical fiber including an optically uniform cured polymer coating is also provided. Such a fiber fabrication process is shown in FIG. 2, which shows two possible locations for a monitor that detects defects. The inspected optical fiber has been inspected, by, for example, viewing the polymer coating with a camera and determining there are, e.g., no physical defects in the polymer coating greater than 25 micrometers over a length of 30 meters or greater, preferably 50 meters or greater and more preferably 100 meters or greater. The camera can take separate images of each length section of the optical fiber, or the images can be taken continuously. The inspection can include reviewing a desired specification, and the inspection can include a computer software program used to compare the actual specification of the optical fiber, based on the images from the camera or using data from other imaging or scattering devices, with the desired specification and marking or otherwise designating a section of fiber to be discarded or otherwise designated as not within specification. Light scattering may also be used. For instance, the Beta LaserMike 360 system records beam deflections due to defects in the fiber coating and can be used to characterize the number of defects in a coating. Such device registers an increase in scattering when a defect passes through the inspection area defined by laser beams that cross the fiber path. In one embodiment, such light scattering must be held below a certain threshold in or for the fiber to be considered defect free. The threshold may be twice the noise level of the detector measuring the light scattering. It may also be set at 10 times the noise level.

A method of manufacture of an optical fiber having an optically uniform cured polymer coating having no physical defects in the coating greater than 25 micrometers, preferably no physical defects in the coating greater than 100 micrometers, over a length of 30 meters or greater, preferably 50 meters or greater, and more preferably 100 meters or greater is also provided, comprising: providing an optical fiber; coating the optical fiber with a coating material in a coating system, wherein the coating step may comprise, for example, one or more of ensuring that the coating material is well-mixed to avoid variations in the local concentration of any of the coating constituents; filtering the coating material to remove particles having an average diameter greater than 100 micrometers; reducing air leakage into the coating system to prevent the presence of air bubbles in the coating system; aligning the fiber in the coating system so the coating thickness at a given point on the optical fiber is within ±5% of an average coating thickness value; curing the coating material to a degree of surface cure of greater than 85%; providing an environment prior to fiber cure which is suitably free of dust and airborne contamination. Other methods may also be employed to ensure that the cured coating is free of external contaminants from any source, is sufficiently uniform in cured composition, and is sufficiently free of perturbations from the coating surface.

The method of manufacture can further comprise inspecting the coating, as further described herein. The method of manufacture can further comprise adjusting one or more steps in the coating system in response to the inspecting. In one embodiment, the inspecting comprises viewing the coating with a camera. Optical fibers manufactured according to the methods described herein are also provided.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiments disclosed.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, or materials that are otherwise not necessary to the achievement of the function or objectives of the compositions, methods, and articles. The singular forms "a," "an," and "the" include plural referents unless the context clearly dictates otherwise. "Or" means "and/or" unless clearly indicated otherwise by context.

The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. The suffix "(s)" is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this disclosure belongs.

I claim:

1. A method of manufacture of an optical fiber having no physical defects in the coating greater than 100 micrometers in size over a length of 30 meters or greater, comprising:
   providing an optical fiber;
   coating the optical fiber with a coating material in a coating system, wherein the coating system comprises one or more of:
      filtering the coating material to remove particles having an average diameter greater than 100 micrometers in size;
      reducing air leakage into the coating system to prevent air bubbles in the coating system having an average diameter of 100 micrometers or greater in size;
      aligning the fiber in the coating system so the coating thickness at a given point on the optical fiber is within ±5% of an average coating thickness value; and
      curing the coating material to a degree of surface cure of greater than 85%; and
   writing an optical device through the optically uniform coating by exposing the optical fiber to actinic radiation after curing the optically uniform coating, wherein the actinic radiation has a wavelength of 200 to 315 nanometers.

2. The method of claim 1, further comprising inspecting the coating using imaging or optical scattering.

3. The method of claim 2, further comprising adjusting one or more steps in the coating system in response to the inspecting.

4. The method of claim 2, wherein the inspecting comprises viewing the coating with a camera.

5. An optical fiber manufactured according to the method of claim 1.

6. A fiber grating, fiber grating array, or continuous fiber grating array made in fibers by the method of claim 1.

* * * * *